(12) United States Patent
Hendricks

(10) Patent No.: US 11,236,773 B2
(45) Date of Patent: Feb. 1, 2022

(54) CLAMP FOR CONNECTING LEDGER TO SHORING POST

(71) Applicant: Titan Formwork Systems, LLC, Tempe, AZ (US)

(72) Inventor: Michael Quentin Hendricks, Rochester, MN (US)

(73) Assignee: Titan Formwork Systems, LLC, Tempe, AZ (US)

( * ) Notice: Subject to any disclaimer, the term of this patent is extended or adjusted under 35 U.S.C. 154(b) by 0 days.

(21) Appl. No.: 17/077,234

(22) Filed: Oct. 22, 2020

(65) Prior Publication Data

US 2021/0040967 A1 Feb. 11, 2021

Related U.S. Application Data

(63) Continuation of application No. 16/159,039, filed on Oct. 12, 2018, now Pat. No. 10,844,888.

(51) Int. Cl.
  *F16B 2/12* (2006.01)
  *F16B 2/14* (2006.01)
  (Continued)

(52) U.S. Cl.
  CPC ............... *F16B 2/12* (2013.01); *E04G 1/14* (2013.01); *E04G 7/306* (2013.01); *E04G 7/32* (2013.01);
  (Continued)

(58) Field of Classification Search
  CPC combination set(s) only.
  See application file for complete search history.

(56) References Cited

U.S. PATENT DOCUMENTS 2,986,183 A * 5/1961 Jackman ............... E04G 13/04
                                                         269/91
3,034,162 A   5/1962 Smith
(Continued)

FOREIGN PATENT DOCUMENTS

CN    2016696067 U    1/2011
EP    3 073 028 A1    9/2016
(Continued)

OTHER PUBLICATIONS

"ToolPro 4 ft. to 11 ft. Adjustable Lag Pole—TP05220", The Home Depot, printed from the internet at < https://www.homedepot.com/p/ToolPro-4-ft-to-11-ft-Adjustable-Lag-Pole-TP05220/206777767?MERCH=REC-_-PIPHorizontal2_rr-_-206777768-_-206777767-_-N>, on Jul. 31, 2019, 2 pages.
(Continued)

*Primary Examiner* — Monica E Millner
(74) *Attorney, Agent, or Firm* — Crowell & Moring LLP

(57) ABSTRACT

The disclosure is directed to a clamp for connecting a ledger to a shoring post. The clamp includes a base member, a ledger-connecting member, and a first jaw, which are fixed connected to each other. The clamp includes a rotatable member inserted into the base member, which is rotatable and slidable in the base member along a longitudinal axis. A portion of the rotatable member is accessible via the slot of the base member. The clamp includes a second jaw fixedly connected to the rotatable member. The clamp further includes a wedge, and when the wedge is inserted into the slot of the base member to engage the rotatable member in a lock position, the first and second jaws are locked to capture two sides of a shoring post.

20 Claims, 15 Drawing Sheets

(51) Int. Cl.
  *E04G 7/30* (2006.01)
  *E04G 7/32* (2006.01)
  *E04G 1/14* (2006.01)
  *F16B 1/00* (2006.01)

(52) U.S. Cl.
  CPC ........ *F16B 2/14* (2013.01); *F16B 2001/0092* (2013.01)

(56) References Cited

U.S. PATENT DOCUMENTS

| | | | |
|---|---|---|---|
| 3,376,011 A | 4/1968 | Petchuk | |
| 3,776,499 A * | 12/1973 | Turner | E04G 17/16 248/298.1 |
| 4,105,239 A | 8/1978 | Akczinski, Sr. | |
| 5,024,037 A * | 6/1991 | Ono | E04G 7/307 52/646 |
| 5,063,652 A | 11/1991 | Roberge | |
| 5,207,527 A * | 5/1993 | Duncan | E04G 7/307 403/246 |
| 5,217,314 A * | 6/1993 | Perruelle | E04G 7/32 403/49 |
| 5,344,258 A * | 9/1994 | Papadopoulos | E04G 1/12 403/353 |
| 5,961,240 A * | 10/1999 | Bobrovniczky | E04G 7/32 403/49 |
| 5,988,318 A * | 11/1999 | Krause | F16B 45/02 182/222 |
| 6,322,277 B1 * | 11/2001 | Jennings | E04G 11/48 403/49 |
| 6,604,766 B2 | 8/2003 | Hassell | |
| 7,588,537 B2 | 9/2009 | Bass | |
| 7,883,296 B2 | 2/2011 | Meyer | |
| 8,065,938 B1 | 11/2011 | Kravitch | |
| 8,393,439 B2 * | 3/2013 | Thacker | E04G 7/02 182/186.8 |
| 8,516,762 B1 | 8/2013 | Jendusa | |
| 8,656,543 B2 | 2/2014 | Porter et al. | |
| 8,931,594 B2 * | 1/2015 | Kreller | E04G 7/22 182/186.8 |
| 9,004,443 B2 | 4/2015 | Zhang | |
| 9,175,472 B1 | 11/2015 | Calini | |
| 9,469,025 B1 | 10/2016 | Ostrobrod | |
| 9,835,188 B2 * | 12/2017 | Bacon | F16B 2/14 |
| 10,487,521 B2 * | 11/2019 | Baron | E04G 17/002 |
| 10,570,633 B2 * | 2/2020 | Bacon | E04G 5/16 |
| 10,662,659 B2 * | 5/2020 | Bacon | E04G 11/38 |
| 2002/0152704 A1 | 10/2002 | Thompson et al. | |
| 2006/0208152 A1 * | 9/2006 | McCracken | E04G 17/045 249/192 |
| 2012/0039686 A1 * | 2/2012 | Miller | F16B 2/14 411/355 |
| 2012/0042495 A1 | 2/2012 | Bacon | |
| 2012/0186910 A1 * | 7/2012 | Thacker | E04G 7/307 182/151 |
| 2014/0270920 A1 | 9/2014 | Bacon | |
| 2015/0014096 A1 * | 1/2015 | Rogers | E04G 1/14 182/178.5 |
| 2017/0334058 A1 | 11/2017 | Koch et al. | |
| 2019/0010717 A1 | 1/2019 | Baron et al. | |
| 2019/0145115 A1 | 5/2019 | Bacon et al. | |

FOREIGN PATENT DOCUMENTS

| | | |
|---|---|---|
| GB | 2535024 A | 8/2016 |
| JP | 6306946 B2 | 4/2018 |
| WO | WO 95/00727 A1 | 1/1995 |

OTHER PUBLICATIONS

"Telescopic Pole—7-18' H-6056", Uline, printed from the internet at <https://www.uline.com/Product/Detail/H-6056/Mops-Squeegees-and-Carts/Telescopic-Pole-7-18?pricode=WA9164&gadtype=pla&id=H-6056&gclid=EAIaIQobChMI1PDk8P_c4wIVA_7jBx3gAQVvEAQYASABEglJYvD_BwE&gclsrc=aw.ds>, on Jul. 31, 2019, 1 page.

"3M DBI-SALA Extendable Pole Hoist—9WHY0|8510409", Grainger, printed from the internet at <https://www.grainger.com/product/9WHY0?gclid=EAIaIQobChMlg4GrP_c4wIVjP7jBx0oBgaqEAQYAiABEgKa8vD_BwE&cm_mmc=PPC:+Google+PLA&ef_id=EAIaIQobChMlg4GrP_c4wIVjP7jBx0oBgaqEAQYAiABEgKa8vD_BwE:G:s&s_kwcid=AL!2966!3!281733071162!!!g!537665576366!>, on Jul. 31, 2019, 3 page.

\* cited by examiner

CLAMP FOR CONNECTING LEDGER TO SHORING POST

The present patent document is a continuation application that claims the benefit of priority under 35 U.S.C. § 120 of U.S. patent application Ser. No. 16/159,039, filed Oct. 12, 2018. The foregoing application is hereby incorporated by reference in its entirety.

BACKGROUND

1. Technical Field

The present disclosure relates to a clamp for connecting multiple rigid, members together, such as connecting a ledger to a shoring post. In particular, the present disclosure relates to a clamp to facilitate assembling a ledger to a shoring post and/or disassembling the ledger from the shoring post.

2. Background Information

A shoring deck or shoring tower is used for bearing heavy loads during construction, such as when pouring concrete for concrete building construction. Therefore, the stability of the shoring deck is important for safety and quality of the finished work. One way to increase the stability of the shoring deck is to add ledgers between shoring posts. However, when the shoring posts are already in place, there lacks a clamp to conveniently and efficiently assemble a ledger to the existing shoring posts.

The present disclosure is directed toward addressing one or more drawbacks, including but not limited to those set forth above.

BRIEF SUMMARY

The present disclosure is directed to a clamp for connecting a ledger to a shoring post. The clamp includes a base member including a slot, a ledger-connecting member fixedly connected to the base member. The ledger-connecting member is configured to be connected to a ledger. The clamp includes a first jaw fixedly connected to the base member. The clamp includes a rotatable member including a first end and a second end. The first end of the rotatable member is configured to be inserted into the base member and be rotatable and slidable in the base member along a longitudinal axis of the rotatable member. A portion of the rotatable member is accessible via the slot of the base member. The clamp includes a second jaw fixedly connected to the second end of the rotatable member. The clamp includes a slot in the rotatable member that engages with a pin in base member and automatically forces the rotation of the rotatable member along its longitudinal axis. The clamp includes a wedge including a bottom end and a top end. The bottom end of the wedge is configured to be inserted into the slot of the base member. When the wedge is inserted into the slot of the base member at a first engage position, the wedge registers the rotatable member in a first lock position. When the wedge is inserted further into the slot of the base member at a second engage position, the wedge registers the rotatable member in a second lock position.

One advantage of the present disclosure is that the second jaw can be rotatable out of the way when the ledger is installed onto the shoring post, so the efficiency of connecting ledgers to shoring posts is greatly improved.

DETAILED DESCRIPTION OF THE DRAWINGS

Figure 1A:
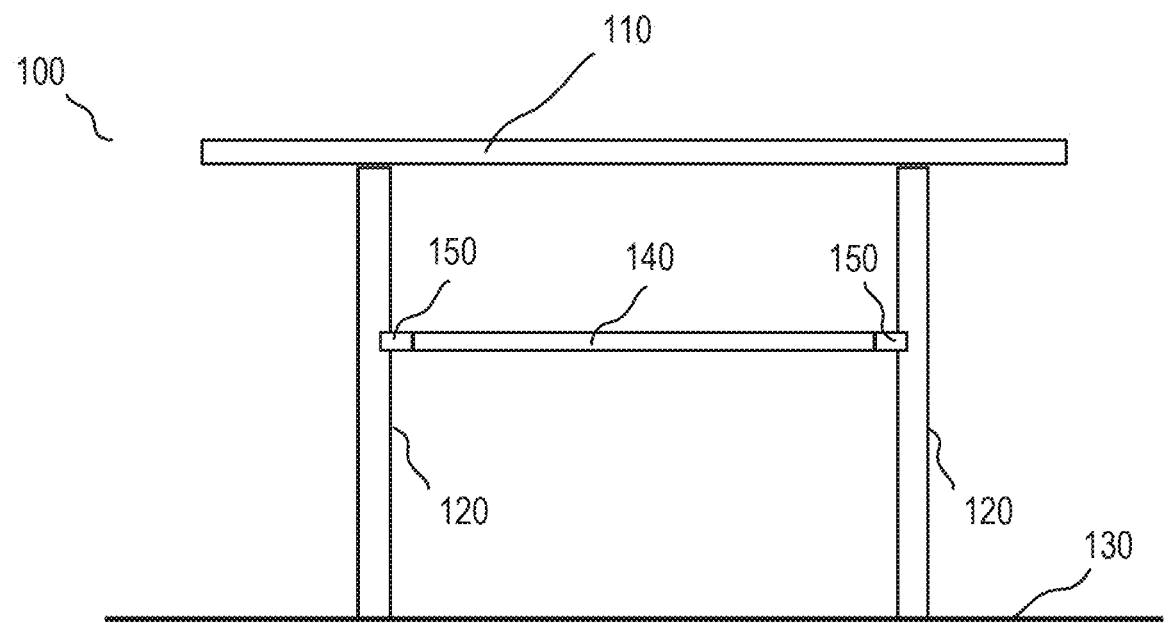
FIG. 1A is a schematic diagram of a deck system.

The disclosure will now be described in detail hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments to be set forth below. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. It is intended, for example, that claimed subject matter includes combinations of exemplary embodiments in whole or in part. Moreover, the phrase "in one implementation" or "in another implementation" as used herein does not necessarily refer to a different implementation, and it is intended that claimed subject matter may include combinations of exemplary implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Poured concrete construction techniques require a shoring deck be established to support concrete, rebar, and other materials during the concrete pouring and during the time the poured concrete cures before the poured concrete is strong enough to support itself. A shoring deck normally includes a plurality of horizontal beams (or at other orientations when the desired final surface isn't horizontal) that is supported by a network of shoring posts that carry the horizontal beams. When a shoring deck is constructed, such as for poured concrete building construction, the shoring deck may be established a large distance above an existing floor (such as either the ground or a poured concrete surface that was previously constructed). For example, the shoring deck may be 9 feet above the floor level, or much higher such as 15, 20, 23, 25 feet above the established floor level or other heights as called for by building plans. The shoring deck is constructed to support a heavy load. The heavy load may include the weight of the poured concrete surface (including concrete, rebar and other engineered materials/structures), the forms for supporting the concrete during the curing process, construction equipment, workers, elements such as wind, rain, snow, etc.

Ledgers or ledger assemblies may be added to the shoring posts to increase the stability of the shoring posts and thus the stability of the shoring deck. The present disclosure describes a clamp with a bolt action that allows a clamping jaw to rotate away from the post shore, so that the clamp may be used to facilitate assembling the ledger to the shoring post and/or disassembling the ledger from the shoring post without moving the shoring post. In another implementation, the clamp in the present disclosure may have a wedge with more than one ramps so that the clamp is capable of lock onto shoring posts with more than one size.

The clamp in the present disclosure can provide a strong connection between the ledger and the shoring post. The connection is strong enough to support scaffold plank and/or personnel loads which may assert on the ledger during assembling and/or disassembling. Personnel loads may also be asserted during access by workers to lower side of shoring deck or other purposes.

As shown in FIG. 1A, the present disclosure describes a deck system 100. The deck system 100 may include a shoring deck 110 supported by a number of shoring posts 120 standing on a floor or ground 130. A ledger 140 having two clamps 150 on both ends may be connected to the shoring posts 120 to increase their stability.

Figure 1B:
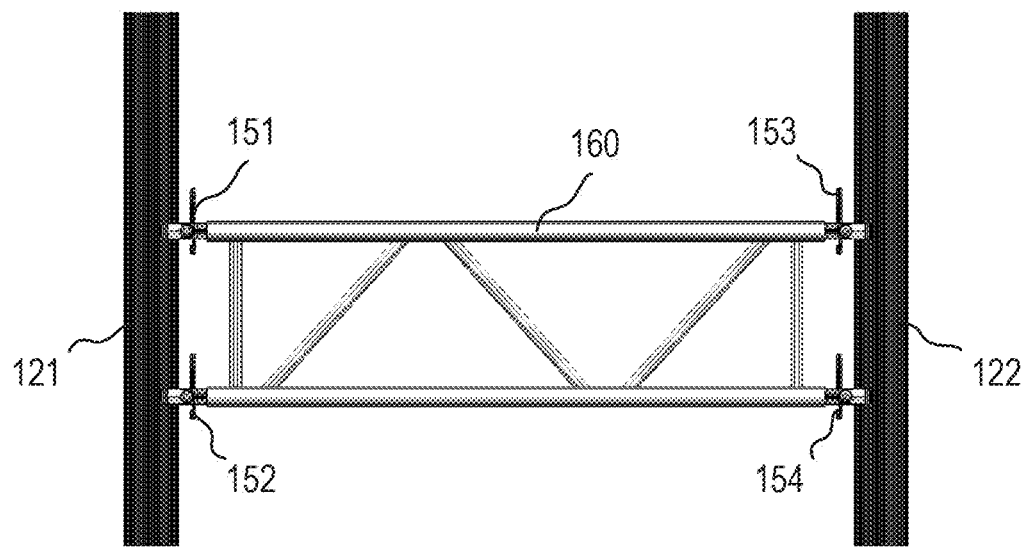
FIG. 1B is a schematic diagram of an embodiment of the deck system shown in FIG. 1A.

FIG. 1B disclose one embodiment of the present disclosure. A ledger assembly 160 may include two ledgers, and a clamp may be disposed at each end of each ledger. The two clamps 151 and 152 at one side of the ledger assembly 160 may be connected to a shoring post 121; and the two clamps 153 and 154 at another side of the ledger assembly 160 may be connected to another shoring post 122.

Figure 2A:
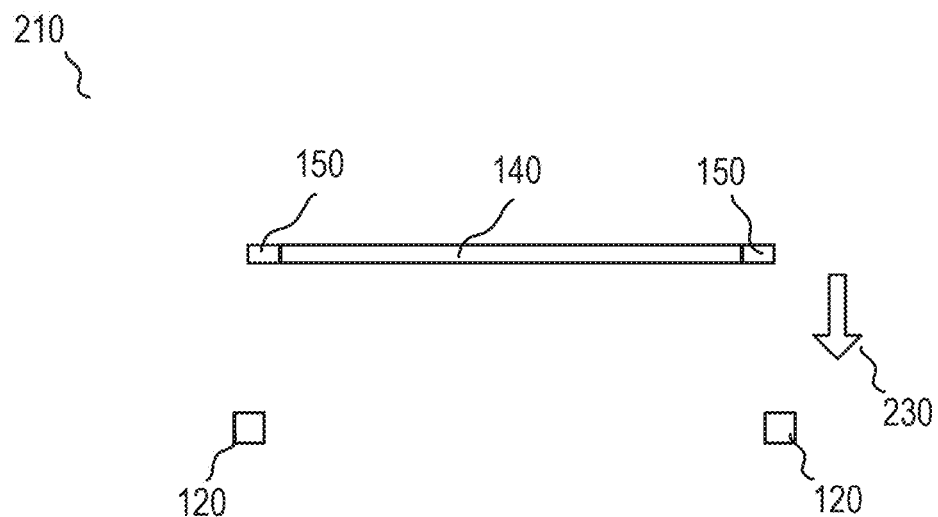
FIG. 2A is a schematic top view of a ledger and shoring posts in an un-assembled condition.
Figure 2B:
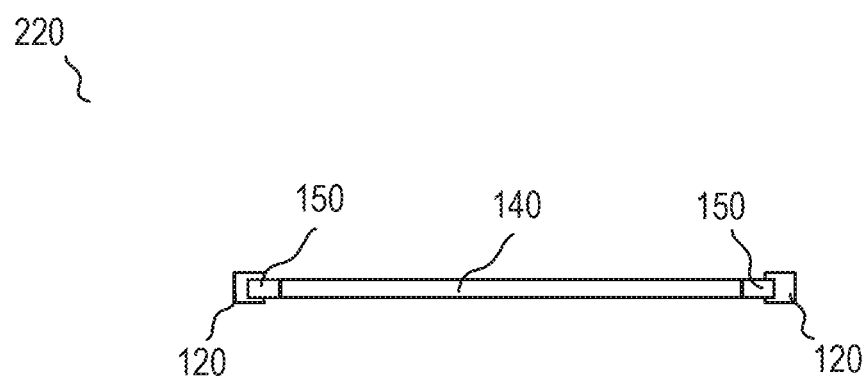
FIG. 2B is a schematic top view of a ledger and shoring posts in an assembled condition.

FIGS. 2A and 2B is a schematic diagram of top view of a ledger 140 with clamps 150 and shoring posts 120. In FIG. 2A, a system 210 may include shoring posts 120 and the ledger 140, which are separated from each other. The shoring posts 120 may be already in place and the ledger 140 may have not assembled with the shoring posts 120 yet. The ledger 140 may have two clamps 150 on both ends. In another implementation, the ledger 140 may have one clamp 150 on one of its ends.

As shown by the arrow 230, the ledger 140 may be taken towards the shoring posts 120. In FIG. 2B, a system 220 may include shoring posts 120 and the ledger 140, which are assembled together with each other. The clamp 150 may capture/lock onto a portion of the shoring post 120 circumferentially.

Figure 3A:
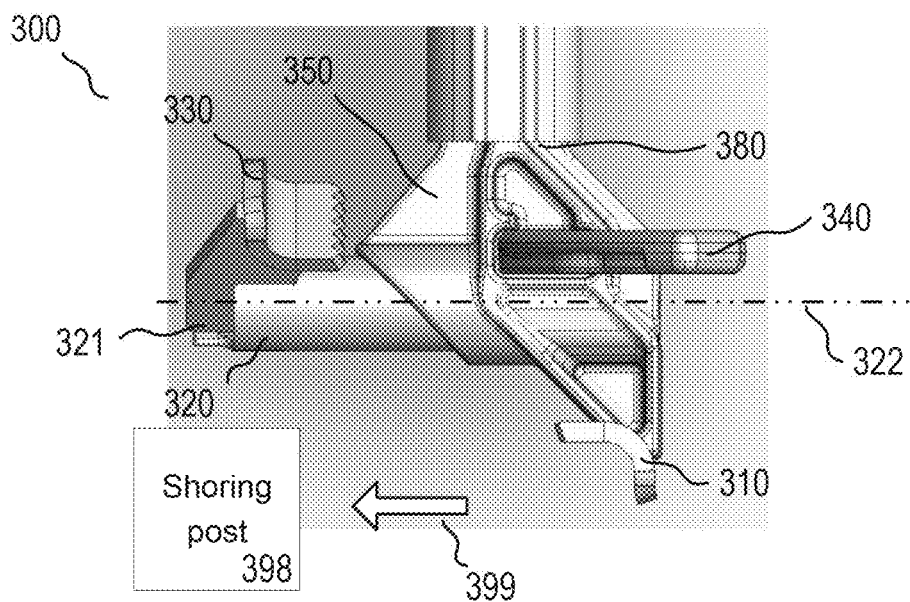
FIG. 3A is a schematic diagram of a clamp in an open configuration.

FIG. 3A is a schematic diagram of a clamp 300. The clamp 300 may include a base member 350 and a wedge 340. The clamp 300 also includes a ledger-connecting member 380. In one implementation, the ledger-connection member 380 may have a rod shape, insert into a ledger, and be secured to the ledger by a fastener, for example but not limited to, the fastener may be a nut/bolt assembly. In one implementation, the ledger-connection member 380 and the base member 350 may be fixedly connected to each other. In another implementation, the ledger-connection member 380 and the base member 350 may be an integrated piece.

The clamp 300 may include a first jaw 310. The first jaw 310 may be connected to the base member 350, and thus the first jaw 310 may remain stationary relative to the base member 350. The first jaw 310 may be called as a fixed jaw since it remains stationary relative to the base member 350. In one implementation, the first jaw 310 and the base member 350 may be fixedly connected to each other. In another implementation, the first jaw 310 and the base member 350 may be an integrated piece.

The clamp 300 may include a rotatable member 320. The rotatable member 320 may generally have a cylindrical shape, and may rotatable along a longitudinal axis 322. The rotatable member 320 may be slidable along the longitudinal axis 322 into the base member 350.

In one implementation when a ledger with clamp is assembled to a shoring post, the longitudinal axis 322 may be substantially parallel with a floor by which the shoring post is supported. In another implementation, the longitudinal axis 322 may be substantially perpendicular to a longitudinal axis of the shoring post and/or a longitudinal axis of the ledger. Substantially with respect to being parallel includes a range of being parallel that is cited plus or minus 5 degrees of being perfect parallel. Substantially with respect to being perpendicular includes a range of being perpendicular that is cited as plus or minus 5 degrees of being perfect perpendicular.

The clamp 300 may include a second jaw 330. The second jaw 330 may be connected to the rotatable member 320 via a connector 321. In one implementation, the connector 321, the second jaw 330, and the rotatable member 320 may be fixedly connected to one other. In another implementation, the connector 321 and the rotatable member 320 may be an integrated piece, and/or the connector 321 and the second jaw 330, and the rotatable member 320 may be an integrated piece.

Figure 3B:
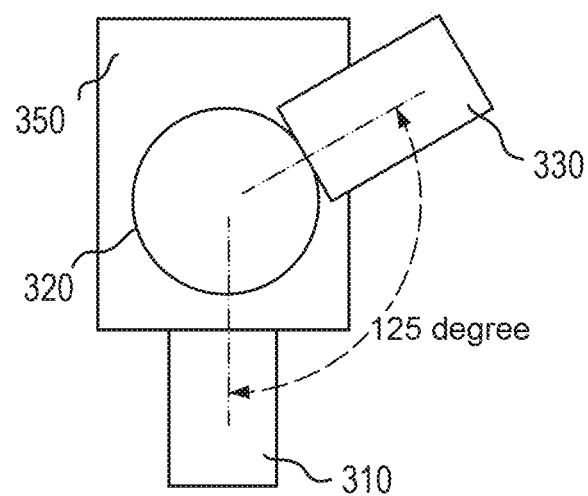
FIG. 3B is a schematic rotational perspective of a first jaw and a second jaw in the open configuration as in FIG. 3A.

When the rotatable member 320 at an open position as shown in FIG. 3A, the second jaw 330 and the clamp 300 is in an open configuration. In this open configuration, the second jaw is substantially misaligned with the first jaw in a rotational perspective, for example but not limited to, the second jaw is about 125 degrees misaligned with the first jaw in the rotational perspective as in FIG. 3B. In one implementation, the misalignment of the first and second jaws in the rotational perspective may be in a range of 45 degrees to 180 degrees, inclusive. In one implementation, the open configuration may be called as a neutral or disengaged configuration.

When the clamp 300 moves towards a shoring post 398 in the direction 399, the second jaw 330 is not in way of the shoring post 398 and the first jaw 310 is capable of capturing the shoring post 398. The second jaw 330 may be called as a movable jaw since it is movable relative to the base member 350.

When the shoring post 398 is captured by the first jaw 310 of the clamp 300, the rotatable member 320 may rotate along the longitudinal axis 322 and/or slides along the longitudinal axis 322, so that the second jaw 330 may rotate and/or slide with the rotatable member 320 to capture the shoring post 398.

Figure 3C:
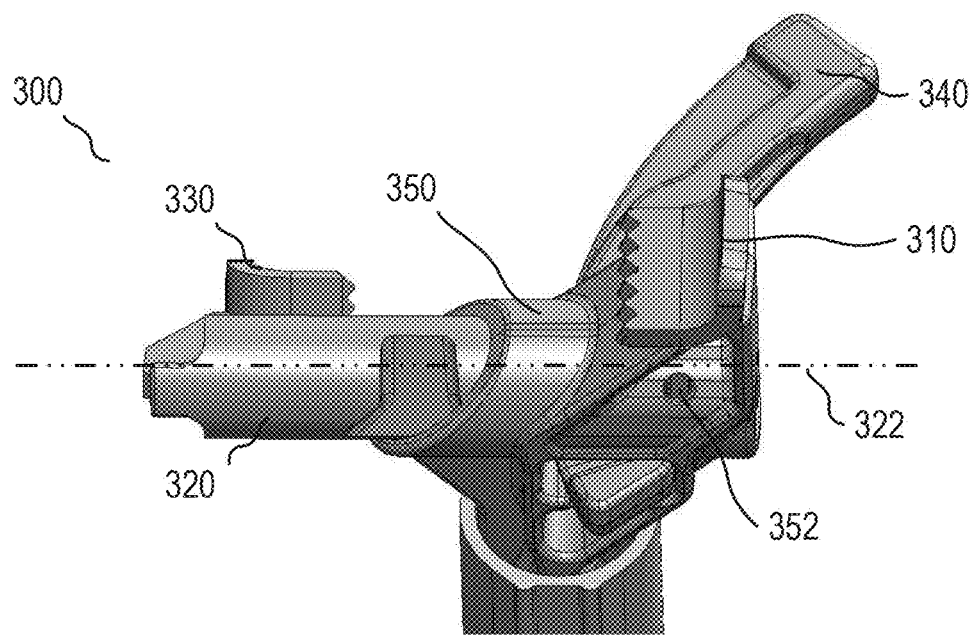
FIG. 3C is another perspective view of a first jaw and a second jaw in the open configuration as in FIG. 3A.
Figure 3D:
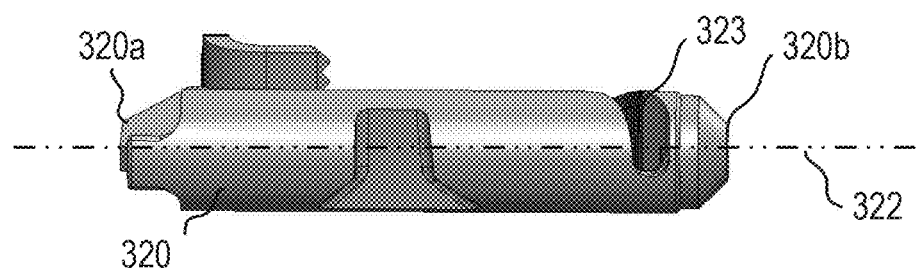
FIG. 3D is another view of the rotatable member as in FIG. 3C.

As shown in FIG. 3C, the base member 350 may have a hole 352 where a pin may be disposed inside the hole 352. FIG. 3D shows the same view as in FIG. 3C when the base member 350 and the wedge 340 are hidden. The rotatable member 320 may have a first end 320a and a second end 320b. The rotatable member 320 may have a slot 323 near the second end 320b. The pin inside the hole 352 may be engaged with the slot 323 to constrain the sliding/rotating motion of the rotatable member 320 inside the base member 350.

Figure 3E:
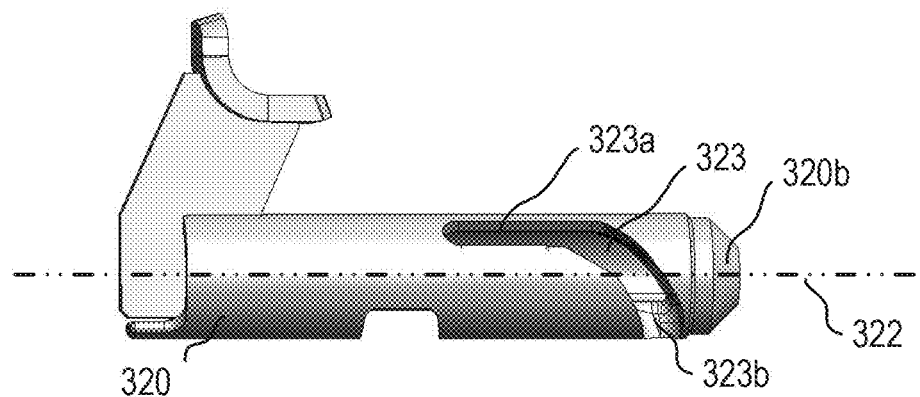
FIG. 3E is another perspective view of the rotatable member as in FIG. 3D.

FIG. 3E shows a different perspective view of the slot 323 of the rotatable member 320 in FIG. 3D. The slot 323 of the rotatable member 320 may include a first portion 323a and a second portion 323b. The first portion 323a is along the longitudinal axis 322 so that when the pin is engaged with the first portion 323a, the rotatable member 320 may slide along the longitudinal axis 322 in the base member 350 but may not rotate. The second portion 323b of the slot 323 has a helix curve as shown in FIGS. 3D and 3E, so that when the pin is engaged with the second portion 323b, the rotatable member may slide along the longitudinal axis 322 in the base member 350 and rotate at the same time.

In one embodiment, when the pin is engaged with the second portion 323b of the slot 323, the sliding motion of the rotatable member 320 along the longitudinal axis 322 in the base member 350 may force a rotational motion of the rotatable member 320. For example, when the rotatable member 320 is struck with a hammer on the second end 320b, which may protrude through the base member 350, the rotatable member 320 is forced to slide out of the base member 350 and rotate into the open configuration so that the second jaw 330 is clear out of the way of the shoring post 398.

Each part of the clamp 300 may be made of durable and strong materials for their individual use, for example and not limited to, stainless steel, steel, iron, galvanized steel, plastic, polypropylene, aluminum, aluminum alloy, or the like. One part of the clamp 300 may be made of the same or different materials from the other part of the clamp 300.

Figure 4A:
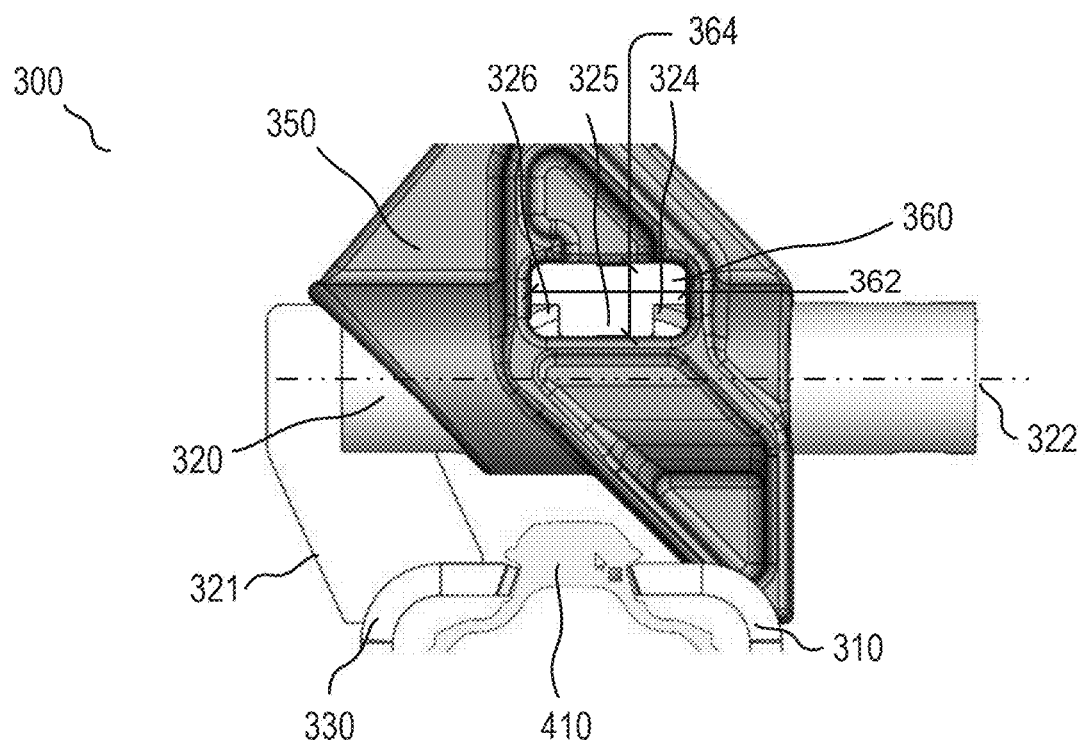
FIG. 4A is a schematic diagram of a clamp in a closed configuration.
Figure 4B:
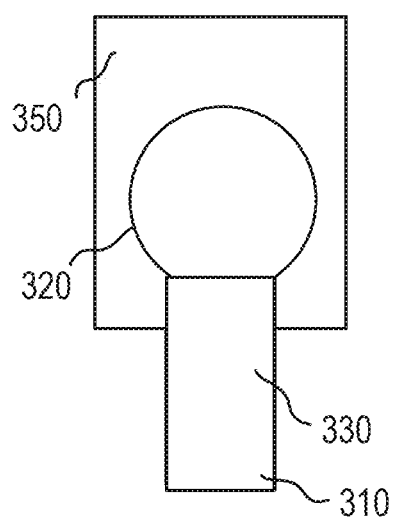
FIG. 4B is a schematic rotational perspective of a first jaw and a second jaw in the closed configuration as in FIG. 4A.

FIG. 4A shows a shoring post 410 is captured by the clamp 300. The clamp may be in a closed configuration and the rotatable member 320 may be in a closed position. In this closed configuration, the second jaw is substantially aligned with the first jaw in a rotational perspective. In another word, the first jaw faces the second jaw. For example but not limited to, the second jaw is about zero degrees aligned with the first jaw in the rotational perspective as in FIG. 4B. The rotatable member 320 may slide along the longitudinal axis so that the first jaw 310 captures a first side of a shoring post 410 and the second jaw 330 captures a second side of the shoring post 410. The first and second sides of the shoring post 410 may be neighbor sides. In another implementation, the first and second sides of the shoring post 410 may be opposite sides. "Substantially" with respect to an angular position includes a range of the reference position (or reference angle) that is cited as plus or minus 2.5 degrees of that reference angle. For example, when the first and second jaws are substantially rotationally aligned, the first and second jaws are parallel to each other plus or minus 2.5 degrees on each jaw. "About" with respect to zero degrees includes a range that is cited as less than 5 degrees.

Figure 4C:
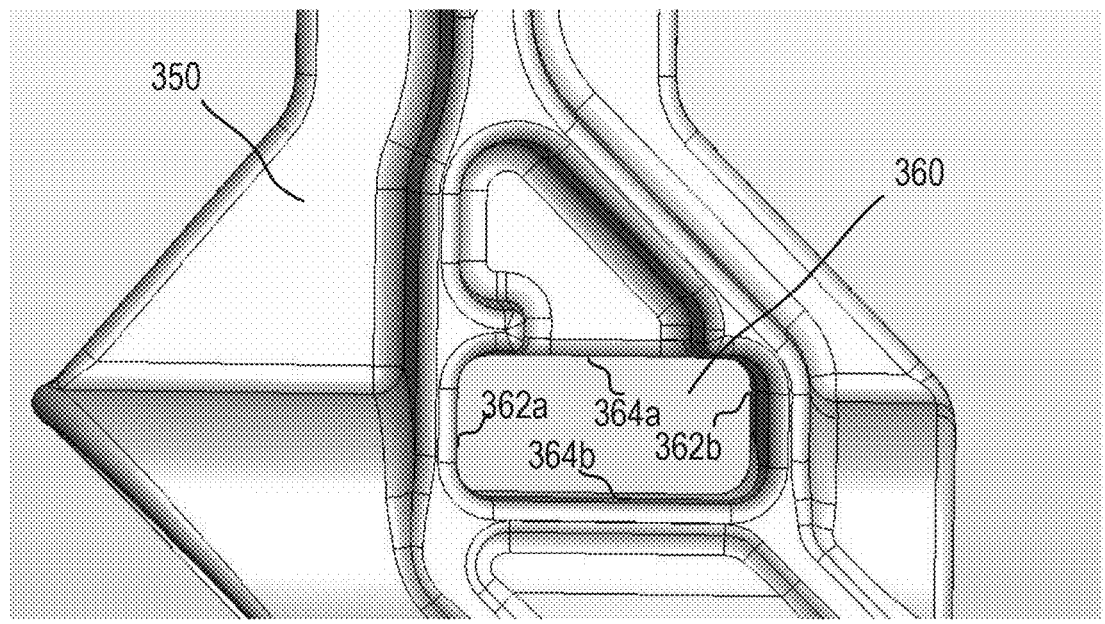
FIG. 4C is a zoom-in view of the base member in FIG. 4A.
Figure 4D:
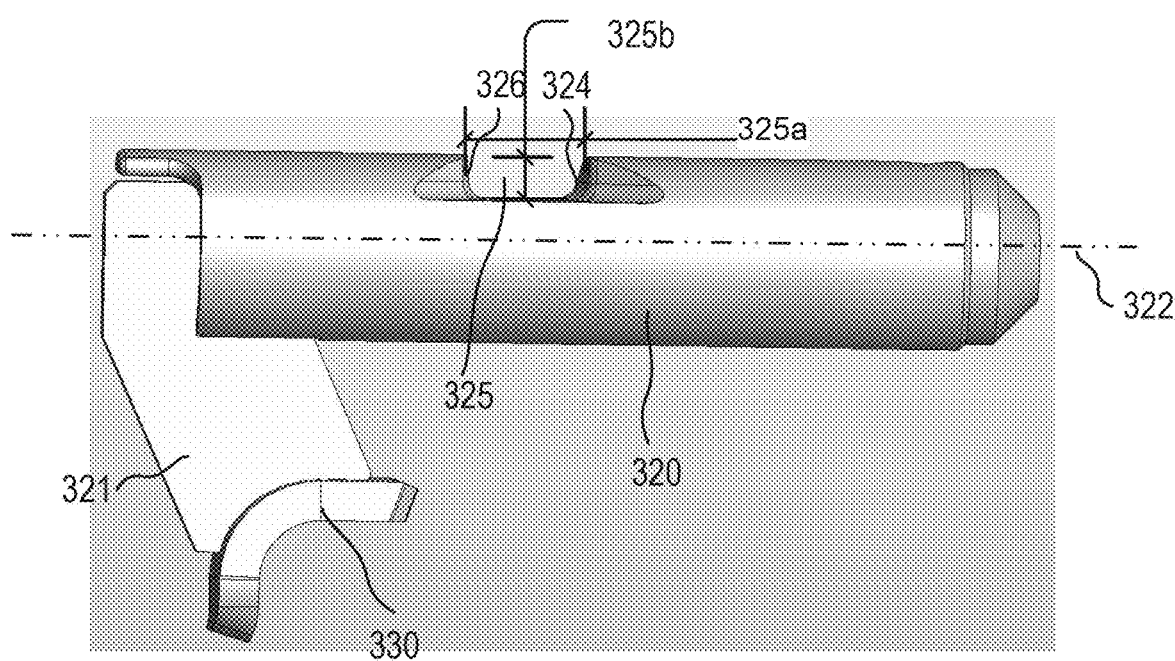
FIG. 4D is a zoom-in view of the rotatable member in FIG. 4A.

For embodiments in FIGS. 4A and 4D, the rotatable member 320 may include a notch 325 along its cylindrical body. The notch 325 may include a first edge 324 and a second edge 326. The first edge 324 is disposed opposite to the second edge 326. The distance between the first edge 324 and the second edge 326 is the width 325a of the notch 325. A depth 325b of the notch 325 is how deep the notch 325 is relative to the cylindrical outer surface of the rotatable member 320.

The base member 350 may include an opening 360, which may be also called a window or a slot 360. When the rotatable member 320 is in the position as shown in FIG. 4A, the notch 325 of the rotatable member 320 may be accessible via the slot 360.

In one embodiment, the slot 360 may have a rectangular shape as shown in FIG. 4C, which includes something with curves in places of corners, or potentially something that is square. The slot 360, along its width direction, includes a first wall 362a and a second wall 362b. The first wall 362a and the second wall 362b are opposite to each other. The slot 360, along its height direction, includes a third wall 364a and a fourth wall 364b, which are opposite to each other. In one implementation as shown in FIG. 4A, the bottom of the notch 325 may be substantially flush with the fourth wall 364b.

Figure 5A:
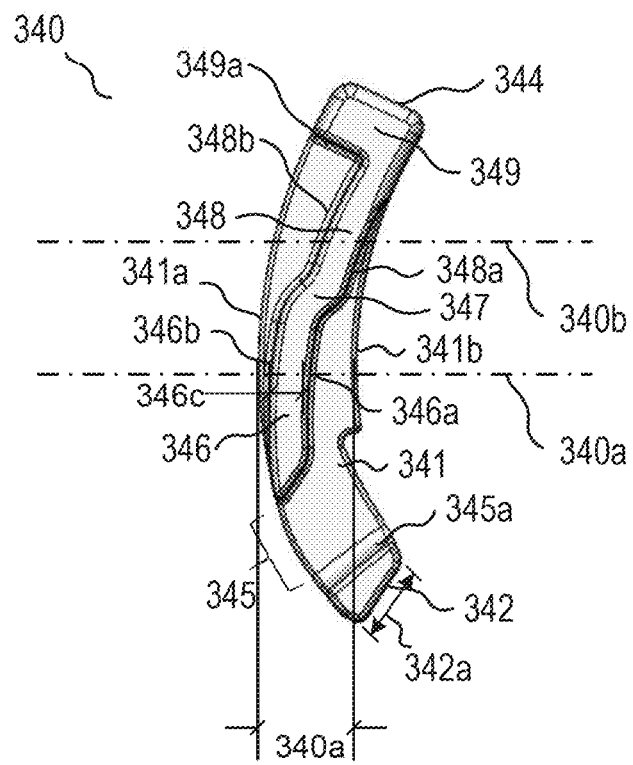
FIG. 5A is a schematic diagram of a wedge.

As shown in FIG. 5A, the clamp 300 may include a wedge 340. The wedge 340 may have a curved shape and include a base plate 341. The base plate 341 may include a top end 344 and a bottom end 342. In one implementation, the wedge 340 may include a single ramp. In another implementation, the wedge 340 may include more than one ramps, for example but not limited to, as shown in FIG. 5A, a first ramp 346 near the bottom end 342, a second ramp 348 near the top end 344, and a transition portion 347. The transition portion 347 is disposed between the first ramp 346 and the second ramp 348. In one implementation, the first ramp 346, the second ramp 348, the transition portion 347, and the base plate 341 may all be an integrated piece. In another implementation, the first ramp 346, the second ramp 348, the transition portion 347, and the base plate 341 may be one or more integrated pieces and then fixedly connect to each other. In some embodiments, the first and/or the second ramps 346, 348 may have the same curvature as one or both edges of the wedge along all or a portion of the first and/or second ramps, while in other embodiments, the first and/or second ramps 346, 348 may have differing curvatures than the edges of the wedge, and in other embodiments one or both of the ramps may include a straight portion.

The wedge may include a first side 341a and a second side 341b. The first side 341a and second side 341b are opposite sides of the wedge. The first ramp 346 may be disposed near the first side 341a, so that a distance of the first ramp 346 to the first side 341a may be smaller than a distance of the first ramp 346 to the second side 341b. The second ramp 348 may be disposed near the second side 341b, so that a distance of the second ramp 348 to the first side 341a may be larger than a distance of the second ramp 348 to the second side 341b.

The width 340a of the wedge 340 may be slightly smaller than a width 362 of the slot 360, so that the wedge may be inserted into the slot 360. In one implementation, the width 340a of the wedge 340 may be smaller than a width 362 of the slot 360 by a pre-determined amount, for example but not limited to, the pre-determined amount may be 0.5 mm, 1 mm, 2 mm, or 5 mm.

Figure 5B:
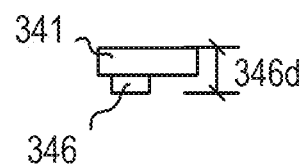
FIG. 5B is one schematic cross-section diagram of the wedge in FIG. 5A.

The first ramp 346 may include a first ramp side 346a and a second ramp side 346b. The width 346c of the first ramp 346 is slightly smaller than or is about equal to the width of the notch 325. FIG. 5B is a cross-section diagram along 340a viewed from the top end 344 towards the bottom end 342 in FIG. 5A. A thickness 346d of the first ramp 346 and the base plate 341 is slightly smaller than or about equal to the height 364 of the slot 360. Herein and in the present disclosure, "about" with respect to being equal to a value includes a range that is cited as between 90% and 110% of the value, inclusive.

Figure 5C:
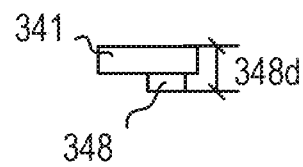
FIG. 5C is another schematic cross-section diagram of the wedge in FIG. 5A.
Figure 5D:
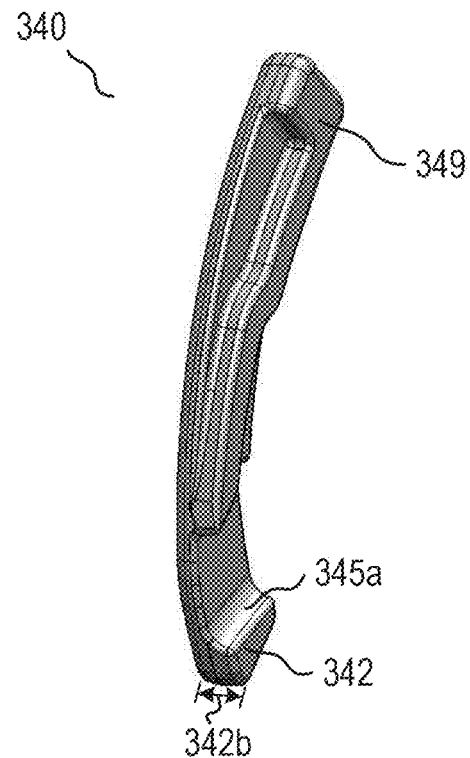
FIG. 5D is another perspective view of the wedge in FIG. 5A.
Figure 5E:
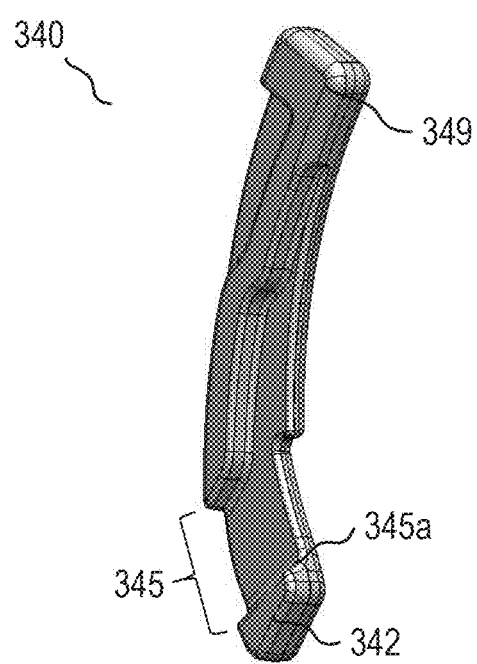
FIG. 5E is another perspective view of the wedge in FIG. 5A.

The second ramp 348 may also include a first ramp side 348a and a second ramp side 348b. The width of the second ramp 348 is about equal to the width 346c of the first ramp 346. FIG. 5C is a cross-section diagram along 340b viewed from the top end 344 towards the bottom end 342 in FIG. 5A. As shown in FIG. 5C, a thickness 348d of the second ramp 348 and the base plate 341 is about equal to the thickness 346d of the first ramp 346 and the base plate 341.

In one implementation, the width 325a of the notch 325 is smaller than a width 362 of the slot 360. In another implementation, the depth 325b of the notch 325 is smaller than the height 364 of the slot 360.

The wedge 340 may include a curvature. In one embodiment, the curvature of the wedge is intentional and has several benefits. One of the benefits is that the curved wedge 340 allows its center of mass to apply the force on the notch 325 against the second side 341b to overcome movement and vibration to keep the wedge remaining (e.g, "hooked") in a neutral position. The neutral position may be a position of the wedge 340 when it is not in a locked position. Another of the benefits is that the curvature of the wedge 340 may create an ergonomic and mechanically efficient "Arc" so that the wedge 340 may travel between various positions easily when a user push the wedge downwards, e.g., by hammering the wedge top end 344. Another of the benefits is that the ergonomic and mechanically efficient curvature of the wedge 340 may allow a smooth releasing when the wedge 340 is pushed upwards, e.g. by hammering the bottom end 342 upwards. Another of the benefits is that, because of the curvature of the wedge 340, the top end 344 and/or the bottom end 342 is effectively spaced away from a shoring post. Thus, when the top end 344 and/or the bottom end 342 is hammered, mistaken hammer blow on the shoring post may be efficiently avoided. As some shoring posts may be made of relatively soft metals, e.g., aluminum, avoiding hammer blows on the shoring post may less likely damage the shoring post.

Figure 8A:
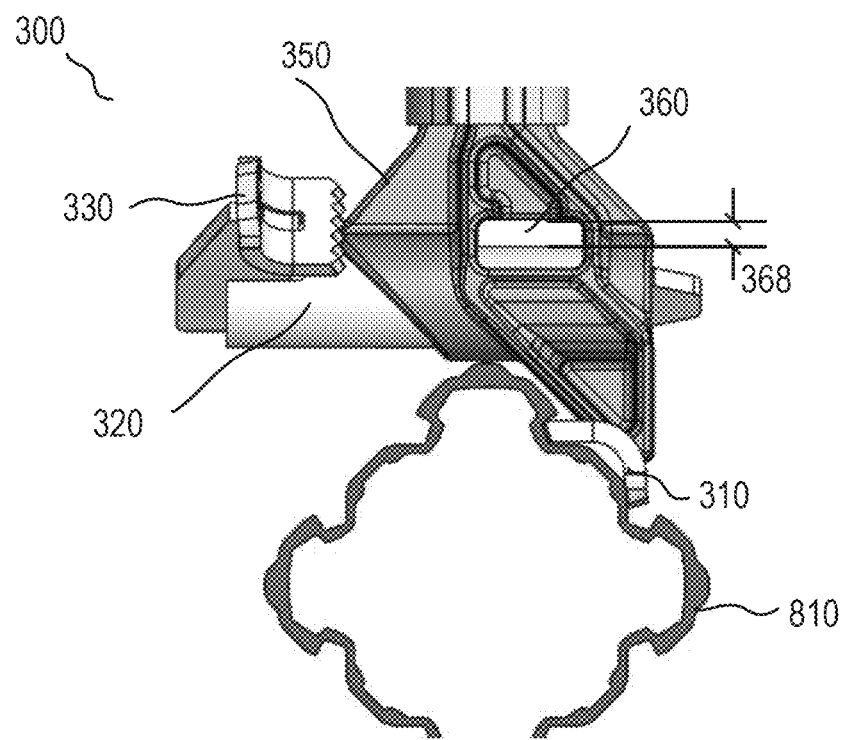
FIG. 8A is a schematic diagram of a clamp in an open configuration when a wedge is removed.
Figure 8B:
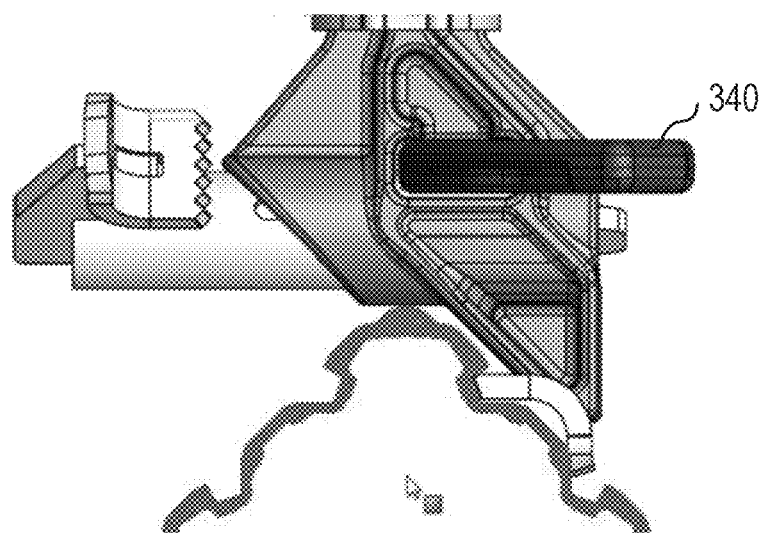
FIG. 8B is a schematic diagram of a clamp in an open configuration when a wedge is inserted.

In another embodiment, the wedge 340 may include a thin portion 345 near the bottom end 342 as shown in FIGS. 5A-5E. The thin portion 345 may have a smaller thickness than a spacing 368 between the top edge of the slot 360 and the cylindrical outer surface of the rotatable member 320, as shown in FIG. 8A. The thickness of thin portion 345 may be just slightly smaller than or about equal to the spacing 368, which may allow the wedge 340 stay in the slot 360 when the clamp is in the open configuration, as shown in FIG. 8B. In one implementation, the thickness of thin portion 345 may be smaller the spacing 368 by a pre-determined amount, for example but not limited to, the pre-determined amount may be 0.5 mm, 1 mm, 2 mm, or 5 mm.

In one implementation, the bottom end 342 of the wedge may have a width 342a just slightly smaller than the width 325a of the notch 325 so that the bottom end 342 may push through the notch 325 when the notch 325 is accessible through the slot 360. The bottom end 342 of the wedge may have a thickness 342b just slightly smaller than the height 364 of the slot 360 and larger than the spacing 368. Therefore, once the rotatable member 320 is inserted into the base member 350 and the pin is engaged with the slot 323 of the rotatable member 320, the rotatable member will not fall out and the wedge is permanently captured and cannot fall out.

Alternatively, in another embodiment, the wedge 340 may include a concaved portion 345a near the bottom end 342 as shown in FIG. 5A. The concaved portion 345a may have a curvature similar to the cylindrical outer surface of the rotatable member 320. The smallest thickness of the concaved portion 345a may be just slightly smaller than or about equal to the spacing 368, and the largest thickness of the concaved portion 345a may be just slightly bigger than or about equal to the spacing 368. The concaved portion 345a may allow the wedge 340 to stay in the slot 360 when the clamp is in the open configuration, as shown in FIG. 8B. In one implementation, the smallest thickness of the concaved portion 345a may be smaller the spacing 368 by a first pre-determined amount, for example but not limited to, the first pre-determined amount may be 0.5 mm, 1 mm, 2 mm, or 5 mm. In another implementation, the largest thickness of the concaved portion 345a may be bigger the spacing 368 by a second pre-determined amount, for example but not limited to, the second pre-determined amount may be 0.5 mm, 1 mm, 2 mm, or 5 mm.

In another embodiment, the wedge 340 may include a top portion 349 at the top end 344, as shown in FIG. 5A. The top portion 349 may connect with the second ramp 348. The top portion 349 may include a bottom edge 349a. When the rotatable member 320 is in the second lock position, the bottom edge 349a of the top portion 349 may be disposed on top of the second edge 326 of the notch 325, which may stop the wedge 340 from moving further into the slot 360. In one implementation, the top portion 349 may have a width larger than the width 325a of the notch 325 and a thickness larger than the spacing 368, so that once the rotatable member 320 is inserted into the base member 350, the wedge is permanently captured and cannot fall out.

Figure 6A:
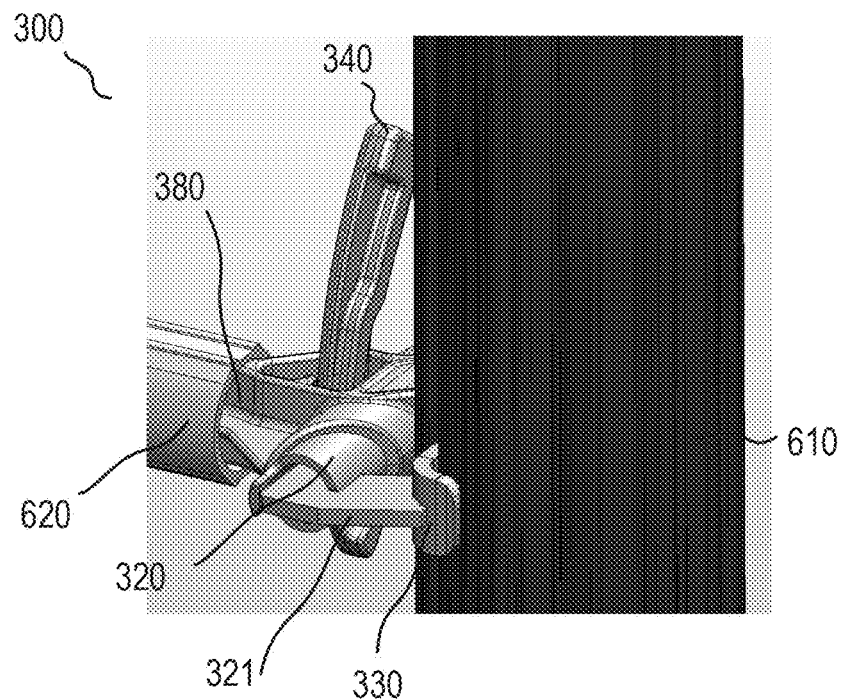
FIG. 6A is a schematic diagram of a clamp in a first engage position.
Figure 6B:
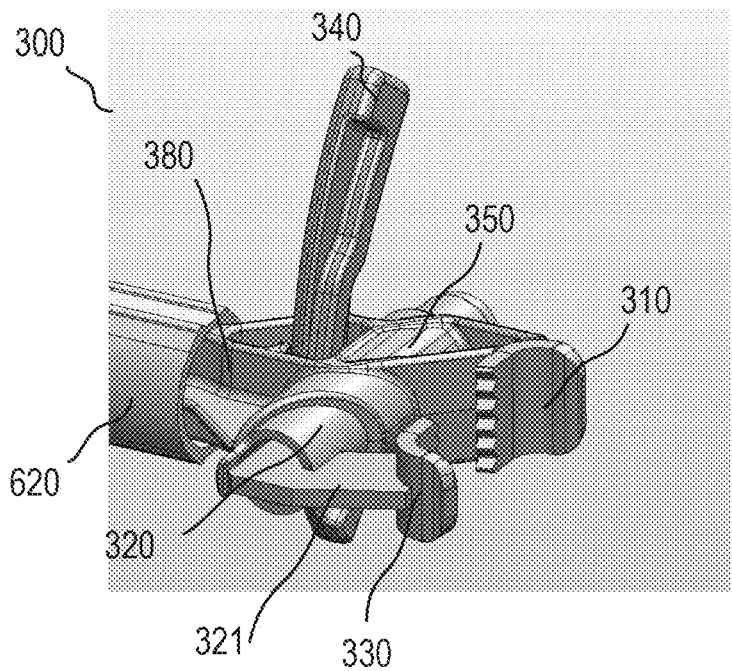
FIG. 6B is a schematic diagram of the clamp in the first engage position as in FIG. 6A when the shoring post is hidden.
Figure 6C:
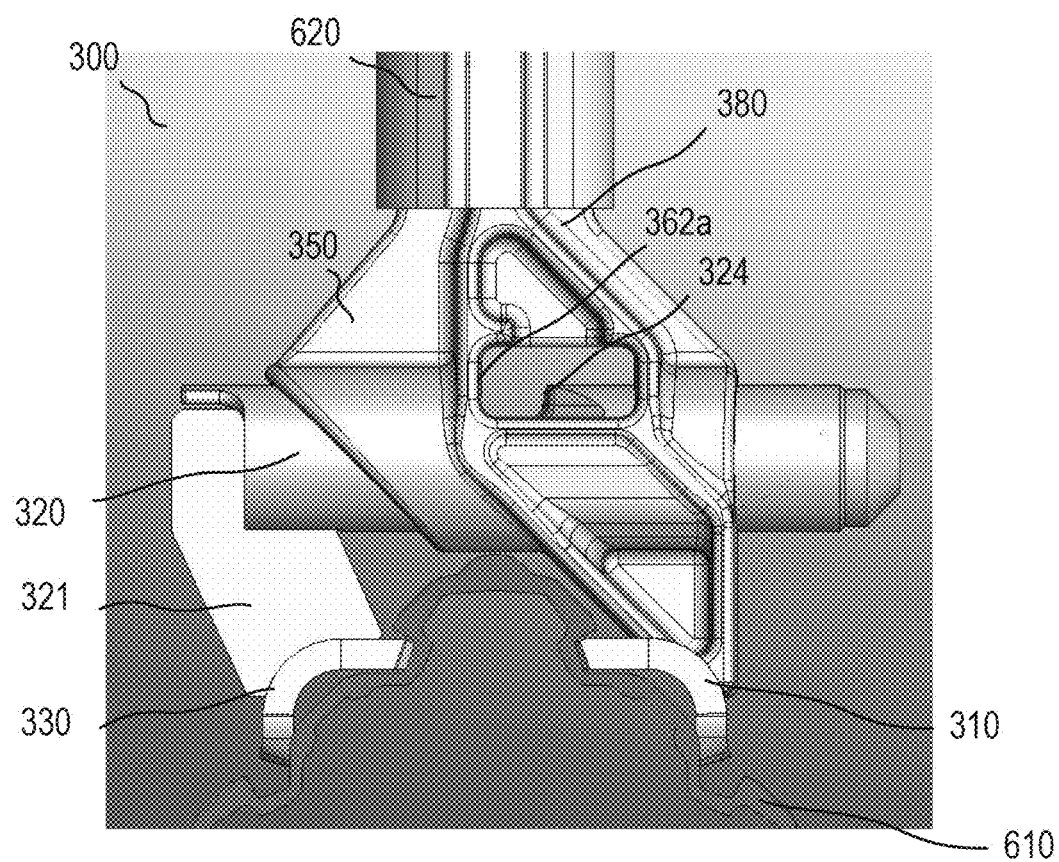
FIG. 6C is another perspective view of the clamp in the first engage position as in FIG. 6A when the wedge is hidden.

As shown in FIGS. 6A-6C, the wedge 340 may be inserted into the slot and engage or register the notch 325 at a first engage position, so that the clamp is engaged to a shoring post 610. The shoring post is hidden in FIG. 6B and the wedge 340 is hidden in FIG. 6C to show the details of other parts of the clamp 300. When the wedge 340 is at the first engage position, the first ramp side 346a of the first ramp 346 of the wedge 340 may engage with the first edge 324 of the notch 325; and the first side 341a of the wedge 340 may engage with the first wall 362a of the slot 360. A first lock position is achieved when the wedge 340 moves downwards so that an expanding distance between the first ramp side 346a of the first ramp 346 and the first side 341a matches (e.g., "wedges") against the now fixed distance between the first edge 324 and the first wall 362a when the shoring post 610 is clamped between the first and second jaws 310 and 330.

When the wedge 340 is at the first engage position and the rotatable member 320 is in the first lock position, the first jaw 310 captures a first side of a shoring post 610, and the second jaw 330 captures a second side of the shoring post 610. In some implementation, the wedge 340 may be pushed downwards into the slot initially by hand, and then be hammered into the fully engaged position so that the first and second jaws 310, 330 may bite/lock onto the first and second sides of the shoring post 610.

The ledger-connecting member 380 of the clamp 300 may be inserted into a ledger 620 and secured onto the ledger 620. In one implementation, the ledger connecting member 380 may be secured onto the ledger 620 by a fastener.

Figure 7A:
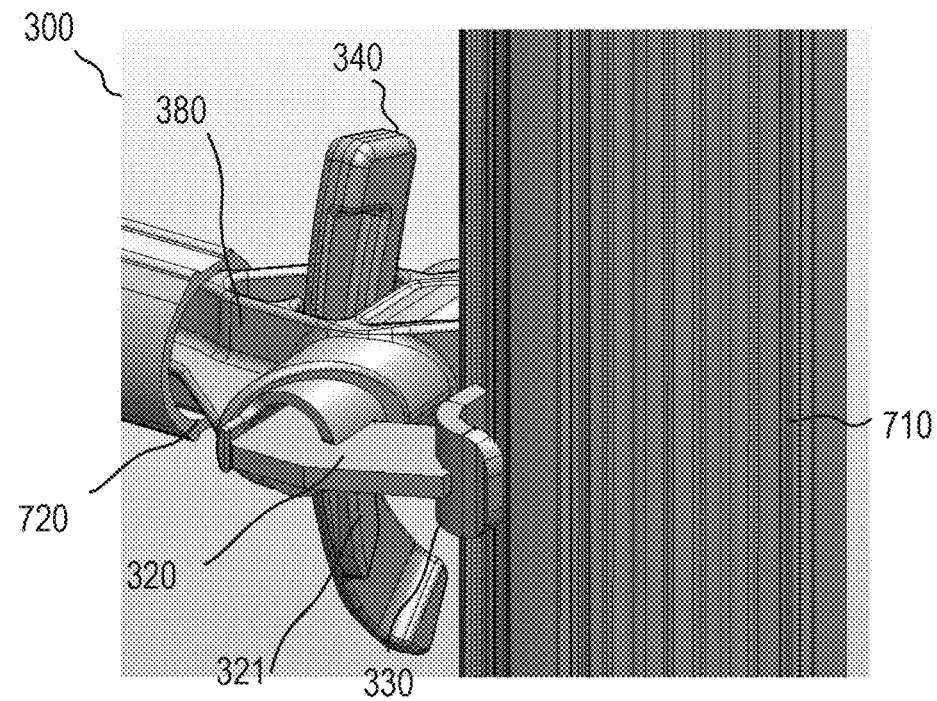
FIG. 7A is a schematic diagram of a clamp in a second engage position.
Figure 7B:
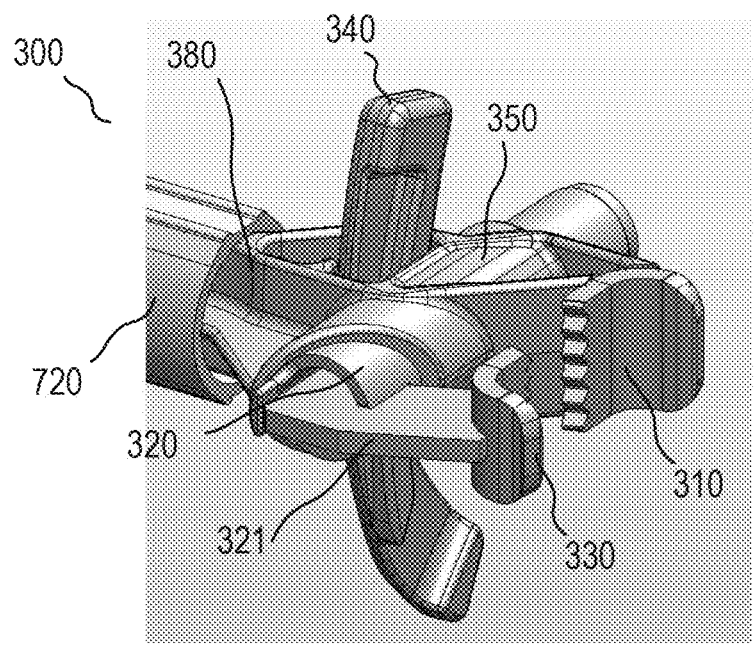
FIG. 7B is a schematic diagram of the clamp in the second engage position as in FIG. 7A when the shoring post is hidden.
Figure 7C:
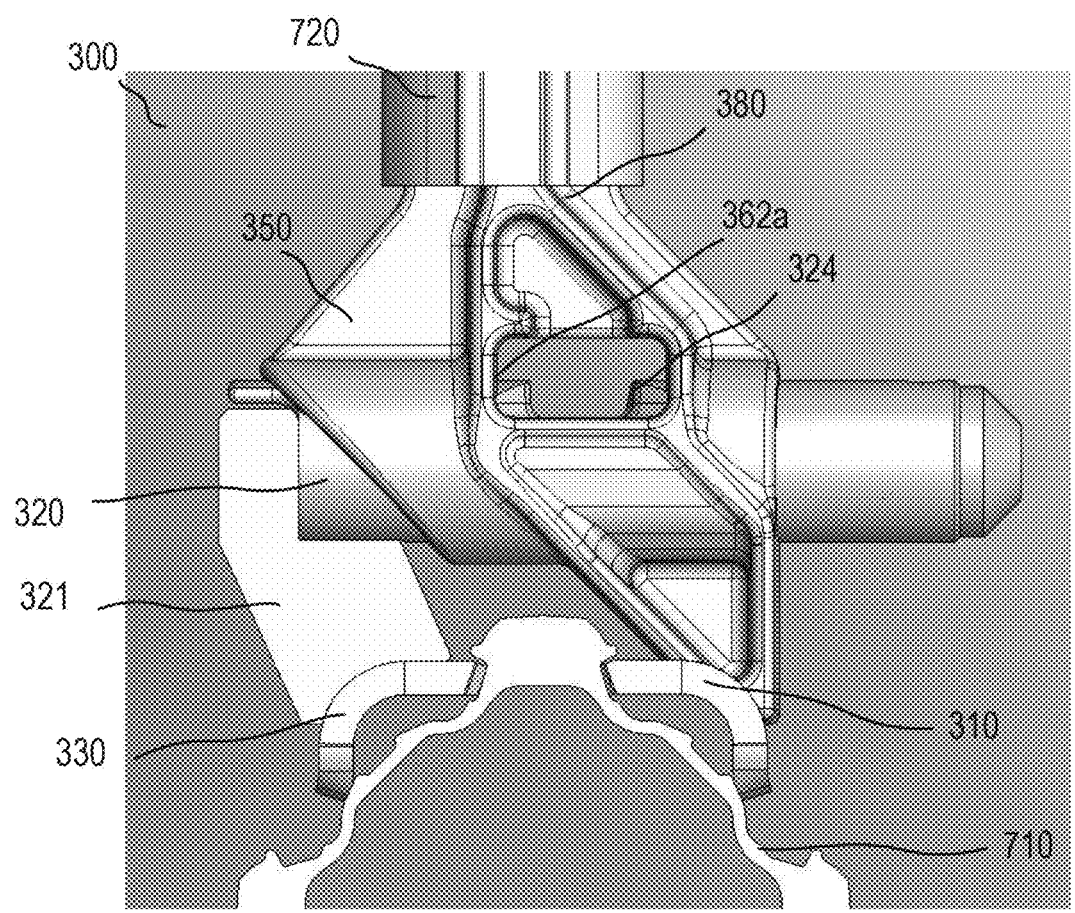
FIG. 7C is another perspective view of the clamp in the second engage position as in FIG. 7A when the wedge is hidden.

Alternatively, for a shoring post 710 with a smaller size than the shoring post 610, the wedge 340 may be in a second engage position, as shown in FIGS. 7A-7C. The shoring post 710 is hidden in FIG. 7B and the wedge 340 is hidden in FIG. 7C to show the details of other parts of the clamp 300. When the wedge 340 is at the second engage position, the first ramp side 348a of the second ramp 348 of the wedge 340 may engage with the first edge 324 of the notch 325; and the first side 341a of the wedge 340 may engage with the first wall 362a of the slot 360. A second lock position is achieved when the wedge 340 moves downwards so that an expanding distance between the first ramp side 348a of the second ramp 348 and the first side 341a matches (e.g., "wedges") against the now fixed distance between the first edge 324 and the first wall 362a when the shoring post 710 is clamped between the first and second jaws 310 and 330.

When the wedge 340 is at the second engage position and the rotatable member 320 is in the second lock position, the first jaw 310 captures a first side of a shoring post 710, and the second jaw 330 captures a second side of the shoring post 710. In some implementations, the wedge 340 may be inserted into the slot initially by hand, and then be hammered into the fully engaged position so that the first and second jaws 310, 330 may bite/lock onto the first and second sides of the shoring post 710.

In comparison with the rotatable member 320 in the first lock position, the rotatable member 320 in the second lock position may slide more/deeper into the base member 350, so that the distance between the first and second jaws 310 and 330 in the second lock position may be smaller to lock on the shoring post 710 than the distance between the first and second jaws 310 and 330 in the first lock position.

A shoring post may have a cross-section. When the shoring post is a cylinder, the cross-section of the shoring post may include a diameter of the cylinder. When the shoring post has a different cross-section shape, for example but not limited to square, hexagonal, or something similar to these or other shapes, the cross-section of the shoring post may include a distance between opposite or different flats or surfaces of the shoring post. In one implementation, the shoring post 710 may have a smaller cross-section than the shoring post 610.

In one embodiment, the ledger-connecting member 380 of the clamp 300 may be inserted into a ledger 720 and secured onto the ledger 720 by a fastener.

Figure 9A:
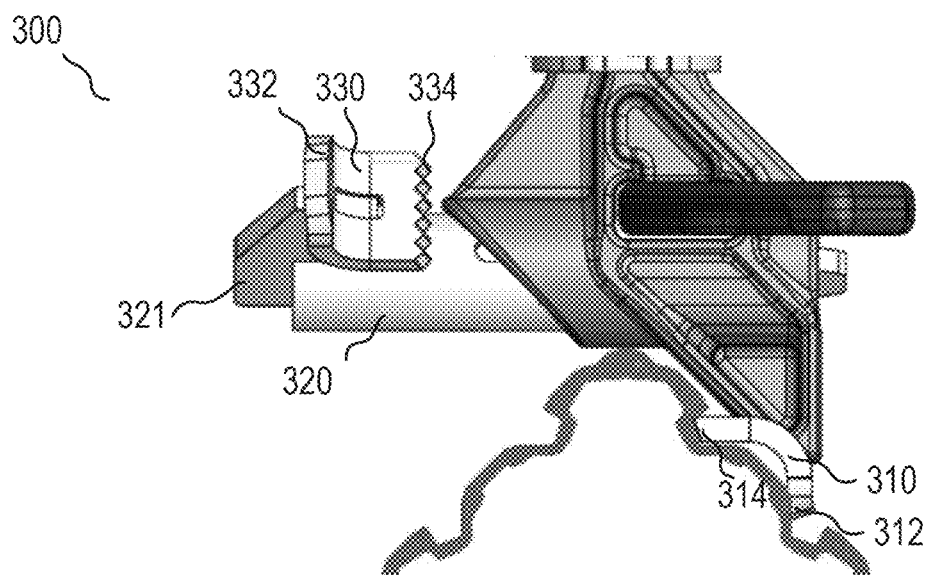
FIG. 9A is a schematic diagram of another embodiment in an open configuration.
Figure 9B:
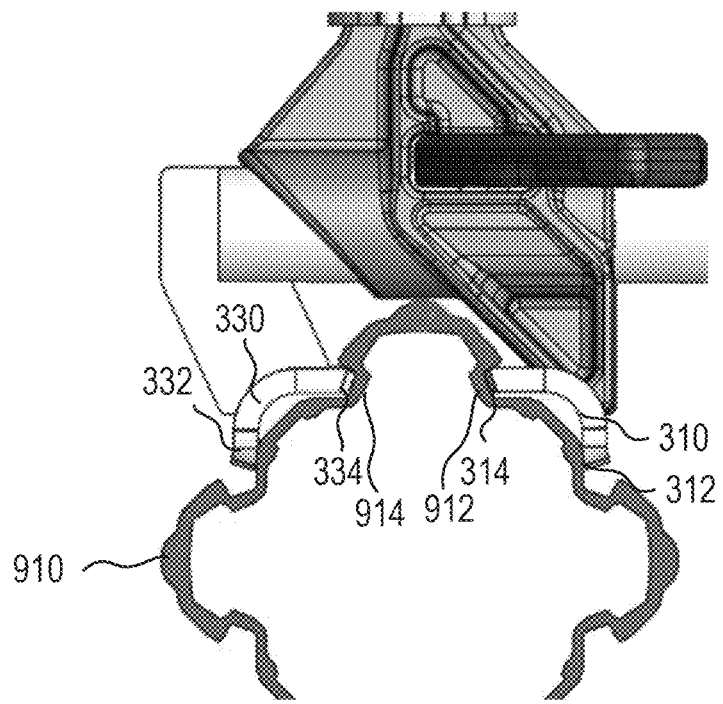
FIG. 9B is a schematic diagram of the embodiment as in FIG. 9A in a closed configuration.

In another embodiment as shown in FIGS. 9A and 9B, a first jaw 310 of a clamp 300 may include a first end 312 and a second end 314, and a second jaw 330 of a clamp 300 may include a first end 332 and a second end 334.

In one implementation, the second end 314 of the first jaw 310 may include a saw shape with a plurality of teeth, such as sharp teeth, and the first end 312 may include a relatively flat shape. When the clamp is in the closed configuration, the first jaw 310 may lock onto a shoring post 910 when the sharp teeth of the second end 314 bite onto a groove 912 of the shoring post 910.

Similarly, the second end 334 of the second jaw 330 may include a plurality of teeth, such as a saw shape with sharp teeth, and the first end 332 may include a relatively flat shape. When the clamp 300 is in the closed configuration, the second jaw 330 may lock onto the shoring post 910 when the sharp teeth of the second end 334 bite onto a groove 914 of the shoring post 910.

As the first jaw 310 and the second jaw 330 lock onto the shoring post 910 from two neighboring or opposite sides, the connection between the clamp 300 and the shoring post 910 can reach the desirable strength to support the weight of the ledger, scaffold plank, personnel, construction tools/equipment/materials, or the like.

In one embodiment, the first and second ends of the first and second jaws 312, 314, 332, and 334 may create four connection points between the clamp and the shoring post, so that maintaining a significantly more rigid and accurately aligned axis between the axis of the shoring post re and the axis of the Ledger than previously used products, which mostly use two connection points.

Figure 10:
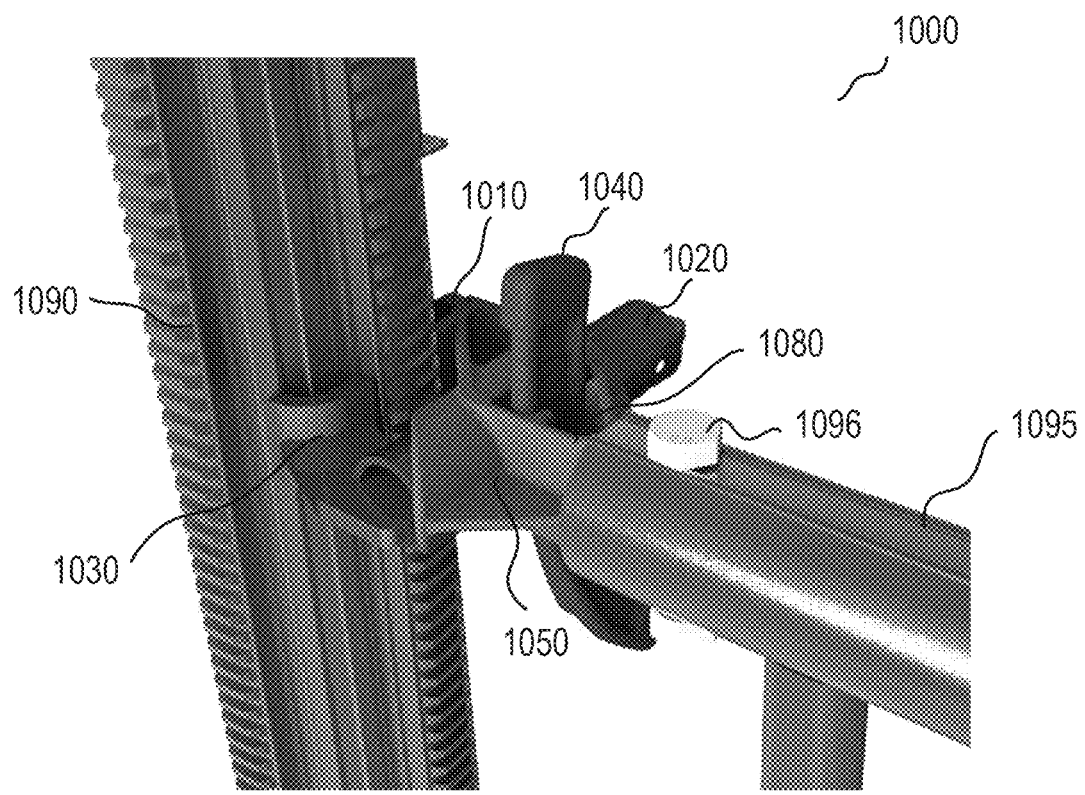
FIG. 10 is a schematic diagram of another embodiment in a closed configuration.

In another embodiment as shown in FIG. 10, a clamp 1000 may connect a ledger or a ledger assembly 1095 to a shoring post 1090. The shoring post 1090 may include a different cross-section profile in comparison with the shoring posts in previous embodiments. The clamp 1000 may include a base member 1050, a first jaw 1010, and a ledger-connecting member 1080. The ledger-connecting member 1080 connects to the ledger 1095 via a fastener 1096. The clamp 1000 may include a rotatable member 1020 connected with a second jaw 1030. The first jaw 1010 and the second jaw 1030 may lock onto the shoring post 1090 by capturing two opposite sides of the shoring post 1090.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A clamp for connecting a ledger to a shoring post, the clamp comprising:
    a base member;
    a ledger-connecting member coupled to the base member;
    a first jaw coupled to the base member;
    a rotatable member comprising a first end and a second end, the rotatable member extending along a longitudinal axis between first and second end regions, and configured to be rotatable around the longitudinal axis and slidable along the longitudinal axis; and
    a second jaw coupled to the rotatable member.

2. The clamp of claim 1, wherein the rotatable member is configured to be inserted into the base member and be rotatable and slidable in the base member along a longitudinal axis of the rotatable member.

3. The clamp of claim 1, wherein the second jaw is fixedly connected to the second end of the rotatable member.

4. The clamp of claim 1, wherein the base member comprises a slot, and wherein a portion of the rotatable member is accessible via the slot of the base member,
    wherein, when a wedge is inserted into the slot of the base member and disposed in a first engage position, the wedge maintains the rotatable member in a first lock position.

5. The clamp of claim 1, wherein:
    the rotatable member is configured to be positioned in an open configuration or a closed configuration;
    when the rotatable member is in the open configuration, the second jaw is substantially misaligned with the first jaw in a rotational perspective; and
    when the rotatable member is in the closed configuration, the second jaw is substantially aligned with the first jaw in the rotational perspective.

6. The clamp of claim 5, wherein:
    when the rotatable member is in the open configuration, the second jaw is about 125 degrees from the first jaw in the rotational perspective; and
    when the rotatable member is in the closed configuration, the second jaw faces the first jaw at about 0 degree.

7. The clamp of claim 1, wherein when the clamp is configured to connect a ledger with a first shoring post, the longitudinal axis of the rotatable member is substantially parallel to a surface on which the first shoring post rests upon.

8. The clamp of claim 1, wherein:
    the first jaw comprises a first end and a second end;
    the first end of the first jaw comprises a flat end; and
    the second end of the first jaw comprises a saw shape with a plurality of teeth.

9. A clamp, comprising:
    a base member coupled to a first jaw;
    a movable member coupled to a second jaw, wherein the position of the movable member is adjustable relative to the base member; and
    a wedge configured to secure the position of the base member relative to the movable member,
    wherein the wedge comprises a curved profile along a longitudinal axis of the wedge between top and bottom ends of the wedge, and
    wherein at least one of the top end or bottom end of the wedge is curvingly spaced away from a central section of the wedge.

10. The clamp of claim 9, wherein the curved profile generally comprises a banana-shaped configuration.

11. The clamp of claim 9, wherein the curved profile of the wedge spaces the top end or the bottom end away from an object being engaged by the first and second jaws.

12. The clamp of claim 9, wherein the movable member is configured to be inserted into the base member and be rotatable and slidable relative to the base member along a longitudinal axis of the movable member.

13. The clamp of claim 9, wherein the bottom end of the wedge is configured to be inserted into a slot of the base member,
    wherein, when the wedge is inserted into the slot of the base member and disposed in a first engage position, the wedge maintains the movable member in a first lock position.

14. The clamp of claim 13, wherein:
    the movable member comprises a notch along a cylindrical portion of the movable member; and
    the notch of the movable member is accessible via the slot of the base member, when the movable member is in a closed configuration.

15. The clamp of claim 14, wherein:
    the wedge comprises a first ramp near the bottom end; and
    when the wedge is positioned within the notch such that the first ramp extends through the notch, the movable member is disposed in the first lock position, which fixes a position of the movable member and the second jaw with respect to the first jaw such that the first and second jaws are disposed at a first distance from each other.

16. The clamp of claim 15, wherein:
    the wedge comprises a second ramp near the top end of the wedge;
    the wedge comprises a transition portion that connects the first ramp and the second ramp;
    the first ramp is disposed at a first ramp distance from a first side of the wedge; and
    the second ramp is disposed at a second ramp distance from the first side of the wedge, the second ramp distance being larger than the first ramp distance.

17. The clamp of claim 16, wherein:
    when the wedge is positioned within the notch such that the second ramp extends through the notch, the movable member is in an second lock position which fixes a position of the movable member and the second jaw with respect to the first jaw such that the first and second jaws are disposed at a second distance from each other, the second distance being smaller than the first distance.

18. A clamp, comprising:
    a base member coupled to a first jaw;
    a movable member coupled to a second jaw, wherein the position of the movable member is adjustable relative to the base member; and a wedge configured to secure the position of the base member relative to the movable member, wherein the wedge comprises a top end a bottom end, wherein the bottom end of the wedge is configured to be inserted into a slot of the base member, wherein, when the wedge is inserted into the slot of the base member and disposed in a first position, the wedge maintains the movable member in a first lock position that fixes a position of the movable member and the second jaw with respect to the first jaw such that the first and second jaws are disposed at a first distance from each other; and wherein, when the wedge is further inserted into the slot of the base member and disposed in a second position, the wedge maintains the movable member in a second lock position that fixes a position of the movable member and the second jaw with respect to the first jaw such that the first and second jaws are disposed at a second distance from each other, the second distance being smaller than the first distance.

19. The clamp of claim 18, wherein the wedge comprises a curved profile along a longitudinal axis of the wedge between the top and bottom ends of the wedge.

20. The clamp of claim 18, wherein the wedge further comprises:

a first ramp near the bottom end of the wedge;

a second ramp near the top end of the wedge; and a transition portion that connects the first ramp and the second ramp, wherein the first ramp is disposed at a first ramp distance from a first side of the wedge, and wherein the second ramp is disposed at a second ramp distance from the first side of the wedge, the second ramp distance being larger than the first ramp distance.

* * * * *